US011313776B2

(12) United States Patent
Sakimoto et al.

(10) Patent No.: US 11,313,776 B2
(45) Date of Patent: Apr. 26, 2022

(54) METHOD FOR EVALUATING BRITTLE CRACK ARRESTABILITY OF STEEL PLATE

(71) Applicant: JFE Steel Corporation, Tokyo (JP)

(72) Inventors: Takahiro Sakimoto, Tokyo (JP); Tsunehisa Handa, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 0 days.

(21) Appl. No.: 16/764,532

(22) PCT Filed: Nov. 14, 2018

(86) PCT No.: PCT/JP2018/042085
§ 371 (c)(1),
(2) Date: May 15, 2020

(87) PCT Pub. No.: WO2019/102912
PCT Pub. Date: May 31, 2019

(65) Prior Publication Data
US 2020/0333225 A1  Oct. 22, 2020

(30) Foreign Application Priority Data
Nov. 22, 2017 (JP) .............................. JP2017-224180

(51) Int. Cl.
*G01N 1/28* (2006.01)
*G01N 1/04* (2006.01)
(Continued)

(52) U.S. Cl.
CPC ...................................... *G01N 3/18* (2013.01)

(58) Field of Classification Search
CPC .. G01N 1/28; G01N 3/00; G01N 3/18; G01N 3/30; G01N 2203/0026; G01N 2203/0066;
(Continued)

(56) References Cited

U.S. PATENT DOCUMENTS

| 9,429,503 B2* | 8/2016 | Seok | G01N 3/08 |
| 2011/0094307 A1* | 4/2011 | Seok | G01N 3/20 |
| | | | 73/851 |
| 2016/0061748 A1* | 3/2016 | Handler | G01N 21/95 |
| | | | 356/402 |

FOREIGN PATENT DOCUMENTS

| EP | 2018929 | 1/2009 |
| EP | 2508866 A1 | 10/2012 |

(Continued)

OTHER PUBLICATIONS

Korean Office Action for Korean Application No. 10-2020-7013695, dated May 24, 2021, with Concise Statement of Relevance of Office Action, 4 pages.

(Continued)

*Primary Examiner* — Brandi N Hopkins
(74) *Attorney, Agent, or Firm* — RatnerPrestia

(57) ABSTRACT

Provided is a method for evaluating brittle crack arrestability of a steel plate by using a large test piece, in which a notch is disposed on one edge in a central portion, in which an embrittled region having a predetermined length L is formed at a tip of the notch or formed so as to include the tip, and in which a fusion zone spaced from the embrittled region is disposed. The fusion zone is formed on one side or both sides of the embrittled region at a distance d from the embrittled region, where d is determined in relation to a thickness t of the steel plate, and a length of the fusion zone is determined by adding ΔL1 (0.3L to −0.3L) to a length L of the embrittled region and by subtracting ΔL2 (0 to 0.4L) from the length L.

2 Claims, 1 Drawing Sheet

(51) Int. Cl.
  *G01N 1/44* (2006.01)
  *G01N 3/02* (2006.01)
  *G01N 3/18* (2006.01)

(58) Field of Classification Search
  CPC ... G01N 2203/0228; G01N 2203/0298; G01N 2203/0039; G01N 2203/0067; G01N 2203/0098; G01N 33/38; G01C 3/02; B23K 9/02; B23K 9/00; B63B 3/34
  See application file for complete search history.

(56) References Cited

FOREIGN PATENT DOCUMENTS

| JP | 63304135 A | 12/1988 |
|---|---|---|
| JP | 5332896 A | 12/1993 |
| JP | 2002267581 A | 9/2002 |
| JP | 2008046106 A | 2/2008 |
| JP | 2015135324 A | 7/2015 |
| JP | 2017003377 A | 1/2017 |
| JP | 2017150067 A | 8/2017 |
| KR | 101140097 B1 | 6/2012 |

OTHER PUBLICATIONS

International Search Report and Written Opinion for International Application No. PCT/JP2018/042085, dated Feb. 19, 2019, 5 pages.
Wiesner, C.S., et al., "Investigations into the Mechanics of Crack Arrest in Large Plates of 1,5%NI TMCP Steel", Fatigue & Fracture of Engineering Materials & Structures, vol. 17, Issue 2, Feb. 1994, pp. 221-233.
WES 3003(1995) "Evaluation Criterion of Rolled Steels for Low Temperature Application", The Japan Welding Engineering Society (Incorporated Association), 16 pages.
Appendix A "Test Method for Brittle Crack Arrest Toughness, Kca" of "Guidelines on Brittle Crack Arrest Design" (1995), Nippon Kaiji Kyokai (Incorporated Foundation), 18 pages.
Extended European Search Report for European Application No. 18 880 403.3, dated Dec. 22, 2020, 7 pages.
Korean Grant of Patent for Korean Application No. 10-2020-7013695, dated Jan. 18, 2022, with translation, 4 pages.

* cited by examiner

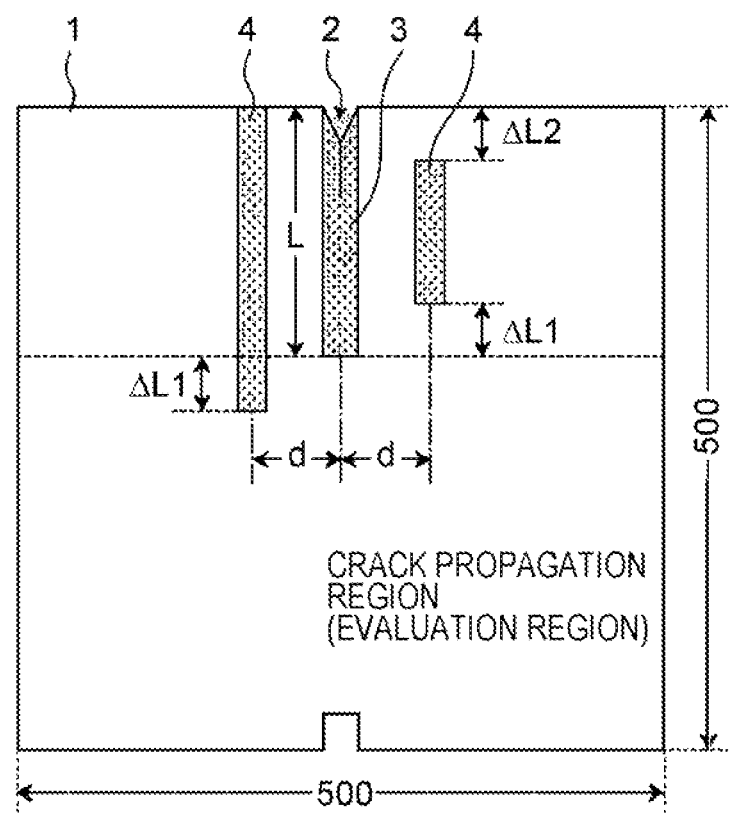

METHOD FOR EVALUATING BRITTLE CRACK ARRESTABILITY OF STEEL PLATE

CROSS REFERENCE TO RELATED APPLICATIONS

This is the U.S. National Phase application of PCT/JP2018/042085, filed Nov. 14, 2018, which claims priority to Japanese Patent Application No. 2017-224180, filed Nov. 22, 2017, the disclosures of these applications being incorporated herein by reference in their entireties for all purposes.

FIELD OF THE INVENTION

The present invention relates to a method for evaluating the brittle crack arrestability of a steel plate which can preferably be used for large structures, such as ships, marine structures, cryogenic storage tanks, buildings, civil engineering structures, and pipelines.

BACKGROUND ART

In the case of large structures, such as ships, marine structures, cryogenic storage tanks, buildings, civil engineering structures, and pipelines, when an accident involving, for example, large-scale damage or destruction occurs due to a brittle fracture, such an accident has a significant impact on the economy and the environment. Therefore, from the viewpoint of preventing a brittle fracture, there is always a demand for an improvement in the safety of structures, particularly in the case of large structures. Therefore, a steel material which is used for such large structures is required to have excellent low-temperature toughness and excellent brittle crack arrest toughness at a temperature at which the steel material is used.

In particular, even if there is any chance of a brittle crack occurring, it is necessary to arrest the brittle crack before the crack propagates to cause a large-scale fracture. Therefore, brittle crack arrest toughness is an important property. In the description below, brittle crack arrest toughness is also referred to as "arrest performance".

In response to such a situation, various kinds of steel materials and large welded structural bodies having improved "arrest performance" have been developed. For example, Patent Literature 1 describes a "method for manufacturing a steel plate having excellent brittle crack arrestability". In the case of the technique described in Patent Literature 1, after a steel slab prepared so as to have a predetermined chemical composition has been heated under the heating condition in which a heating temperature and a holding time are appropriately controlled, the steel slab is subjected to rolling followed by accelerated cooling with a rolling temperature and a rolling reduction ratio being controlled. It is indicated that, with this, it is possible to obtain a steel plate excellent in terms of brittle crack arrestability having: a microstructure including, in terms of area ratio, ferrite: 20% to 50%, pearlite: 5% or less, and bainite: 40% to 80%, in which the average circle-equivalent diameter of 20% of precipitates and inclusions based on the number counted from the largest grain diameter is 0.4 μm or less, and in which a crack propagation effective grain diameter is equal to or less than d (μm) defined by a specified equation related to the Ni content and the plate thickness, a thickness of 50 mm or more, and a yield strength of 460 MPa or more.

In the case of the technique described in Patent Literature 1, the evaluation of "arrest performance" is performed, in accordance with the method prescribed in WES 2815 (2014), on the basis of a temperature at which Kca is equal to 6000 N/mm$^{1.5}$ in a temperature-gradient ESSO test performed on a test piece having a width of 500 mm with the overall thickness taken from a steel plate. In the case of the steel plate obtained with the technique described in Patent Literature 1, the temperature at which Kca is equal to 6000 N/mm$^{1.5}$ is −10° C. or lower.

As described above, the evaluation of the arrest performance of a steel plate used for a large welded structure or a large welded structural body is usually performed by conducting a temperature-gradient ESSO test in accordance with the method described in Non Patent Literature 1 or Non Patent Literature 2, or by conducting a flat-temperature type CAT (Crack Arrest Test) with an embrittled portion described in Non Patent Literature 3. Examples of the flat-temperature type CAT (hereinafter, also referred to as "CAT") include a double-tension type crack arrest test described in Non Patent Literature 3 and a type of crack arrest test utilizing a wedge driven into the edge portion of a test piece.

In the CAT, usually, a brittle crack is artificially generated by using a large test piece (having a certain thickness (mm) and an area of about 500 mm×500 mm) having a V-notch in the edge portion, by cooling the test piece to a predetermined temperature, and by applying an impact load to the V-notch via a wedge while applying a predetermined stress to the test piece. Then, on the basis of a temperature at which the generated brittle crack is arrested, the brittle crack arrestability of the steel material is evaluated. Here, in many cases, to promote the generation of a brittle crack at the notch and the propagation of the brittle crack, an embrittled region is formed at the notch tip in the propagation direction of the crack. For example, Non Patent Literature 3 describes the outline of a double-tension type crack arrest test performed on a wide test piece (having a certain thickness (mm) and an area of 880 mm×1500 mm). In this test, a crack is generated in a saw-cut notch which is formed between a main plate and a tub for secondary load application, and, to promote the generation and propagation of the crack, an embrittled region is formed at the saw-cut notch tip. Here, the embrittled region is formed by melting a narrow region in the test piece by using an electron beam technique.

PATENT LITERATURE

PTL 1: Japanese Unexamined Patent Application Publication No. 2017-150067

Non Patent Literature

NPL 1: WES 3003 (1995) "Evaluation Criterion of Rolled Steels for Low Temperature Application", The Japan Welding Engineering Society (Incorporated Association)

NPL 2: Appendix A "Test Method for Brittle Crack Arrest Toughness, Kca" of "Guidelines on Brittle Crack Arrest Design" (1995), Nippon Kaiji Kyokai (Incorporated Foundation)

NPL 3: C. S. WIESNER, B. HAYES, S. D. SMITH and A. A. WILLOUGHBY, "INVESTIGATIONS INTO THE MECHANICS OF CRACK ARREST IN. LARGE PLATES OF 1.5% Ni TMCP STEEL", Fatigue & Fracture of Engineering Materials & Structures, Volume 17, Issue 2 Feb. 1994, Pages 221-233

SUMMARY OF THE INVENTION

However, in the case of the above-described CAT utilizing a large test piece having an embrittled region at a notch tip, FPD (Fracture Pass Deviation), in which an artificially generated brittle crack deviates from the middle of the embrittled region to the base metal instead of propagating through the embrittled region, may occur depending on the test condition. In the case where such FPD occurs, there is a problem in that, since it is not possible to correctly determine the brittle crack arrestability of the steel plate, the test is ineffective, which makes it difficult to evaluate the brittle crack arrestability of the steel plate.

Therefore, an object according to aspects of the present invention is to provide a method for evaluating the brittle crack arrestability of a steel plate with which it is possible to achieve an effective evaluation result regardless of test conditions. Here, the term "steel plate" denotes a steel plate having a thickness of 10 mm or more.

To achieve the object described above, the present inventors diligently conducted investigations regarding the factors for the occurrence of FPD, in a flat-temperature type CAT using a large test piece, in which a brittle crack which is artificially generated in a notch deviates from the middle of an embrittled region formed in the propagation direction of the crack to a base metal instead of propagating through the embrittled region. In this case, as the notch, a V-notch having a tip angle of 30° was formed by performing, for example, machining. In addition, an embrittled region including the notch tip was formed in the propagation direction of the crack. Here, the embrittled region was formed by performing fusion welding on a narrow region in the propagating direction of the crack by using an electron beam welding method.

First, by performing finite element analysis with consideration being given to thermal elasto-plasticity regarding the above-described ESSO test piece in which an embrittled region including a notch tip is formed, a stress field in a test piece before a brittle crack propagates was calculated. As a result, it was found that the embrittled region is in a biaxial stress state involving a tensile residual stress in the welding line direction due to fusion welding and a tensile stress applied in the test.

Therefore, under the assumption that the brittle crack deflects (deviates) from the embrittled region and propagates due to the influence of a biaxial stress state, the present inventors further conducted investigations regarding a method for removing a tensile residual stress in the embrittled region and, as a result, found that, to remove a tensile residual stress in the welding line direction in the embrittled region, it is effective to perform fusion welding having a predetermined length in a predetermined region in the vicinity of the embrittled region in the test piece.

The tensile residual stress in the welding line direction in the embrittled region generates a compressive residual stress in the welding line direction in a base metal outside the embrittled region in the test piece so that stress balance is maintained across the whole test piece. Therefore, it was found that, by performing fusion welding on the base metal, in which the compressive residual stress is generated, it is possible to remove the compressive residual stress, which results in the tensile residual stress in the embrittled region being removed.

Aspects of the present invention have been completed on the basis of the knowledge described above and additional investigations. That is, the subject matter according to aspects of the present invention is as follows.

(1) A method for evaluating brittle crack arrestability of a steel plate, the method including using a large test piece, cooling the large test piece to a predetermined temperature, applying a predetermined stress to the cooled large test piece, forming a crack propagating in the stressed test piece, and evaluating brittle crack arrestability of the steel plate, in which the large test piece is a test piece having a width of 500 mm or more and a length of 500 mm or more taken from the steel plate, a notch, at which a brittle crack is generated, is disposed on one edge in a central portion in a stress-application direction of the large test piece, an embrittled region having a predetermined length L extending in a propagation direction of the brittle crack is formed at a tip of the notch or formed so as to include the tip, and a fusion zone spaced from the embrittled region is formed in at least one location in the test piece after the embrittled region is formed, the fusion zone being formed at a position satisfying expression (1) and having lengths satisfying expressions (2) and (3).

$$1.0t \leq d \leq 7.0t \quad (1)$$

(where d: distance (mm) between a center of the embrittled region and a center of the fusion zone and t: thickness (mm) of the test piece (steel plate))

$$-0.3L \leq \Delta L1 \leq 0.3L \quad (2)$$

$$0 \leq \Delta L2 \leq 0.4L \quad (3)$$

(where L: length (mm) of the embrittled region, $\Delta L1$: distance (mm) in the propagation direction of the brittle crack between a front edge of the embrittled region and a front edge of the fusion zone (where negative value denotes a position on a non-evaluation region side from the front edge of the embrittled region and a positive value denotes a position on an evaluation region side from the front edge of the embrittled region), and $\Delta L2$: distance (mm) in the propagation direction of the brittle crack between an edge of the test piece and an edge of the fusion zone)

(2) The method for evaluating brittle crack arrestability of a steel plate according to item (1), in which the large test piece is a double tensile test piece.

According to aspects of the present invention, even in the case where testing conditions are variously changed, a brittle crack does not deflect from the predetermined propagation region and no test is thus ineffective. With this, there is a significant improvement in the test efficiency of a CAT for evaluating the brittle crack arrestability of a steel plate, which has a significant effect on the industry.

BRIEF DESCRIPTION OF THE DRAWINGS

The FIGURE is a schematic diagram of a large test piece used in accordance with aspects of the present invention.

DETAILED DESCRIPTION OF EMBODIMENTS OF THE INVENTION

One aspect of the present invention is a method for evaluating brittle crack arrestability of a steel plate. In accordance with aspects of the present invention, the brittle crack arrestability of a steel plate is evaluated by using a large test piece, by cooling the large test piece to a predetermined temperature, by applying a predetermined stress to the large test piece, and by forming a crack propagating in the stressed test piece.

In accordance with the FIGURE, the large test piece used in accordance with aspects of the present invention will be described.

The FIGURE is a schematic diagram of a large test piece used in accordance with aspects of the present invention. As illustrated in the FIGURE, in accordance with aspects of the present invention, a large test piece 1 (hereinafter, also referred to as a "test piece") which is taken from a steel plate (having a thickness of t mm), that is, an evaluation object, and which has a width of 500 mm or more and a length of 500 mm or more is used.

In the case of the large test piece used, a notch 2, in which a brittle crack is generated, is disposed on one edge in the central portion in the stress-application direction of the large test piece. Although there is no particular limitation on the shape of the disposed notch 2, the shape is set to be one with which it is possible to form a brittle crack by applying striking energy via, for example, a wedge. For example, it is preferable that the shape be a V-shape, and a saw-cut notch may further be formed at the notch tip. Moreover, in the case of the large test piece 1 used in accordance with aspects of the present invention, an embrittled region 3 having a predetermined length L (and a width of about 5 mm) extending in the propagation direction of the brittle crack is formed at the tip of the notch 2 or formed so as to include the tip. It is preferable that such an embrittled region 3 be a narrow region extending in the propagation direction of the crack formed by performing fusion welding by using an electron beam welding method. Examples of fusion welding other than that performed by using an electron beam welding method include that performed by using a laser beam welding method or an arc welding method. Here, it is preferable that the width of the embrittled region 3 be 1 mm to 10 mm.

In the case where the embrittled region 3 is formed, a tensile residual stress in the welding line direction due to fusion welding is generated in the test piece 1 and a tensile stress in a direction perpendicular to the direction of the residual stress is applied when a test is performed, and the embrittled region is thus in a biaxial stress state. Therefore, a brittle crack, which has been generated in the notch 2, may deflect from the predetermined embrittled region 3. Here, the tensile residual stress in the welding line direction in the embrittled region 3 generates a compressive residual stress in the welding line direction in a base metal outside the embrittled region 3 and stress balance is thus maintained across the whole test piece 1.

Therefore, in accordance with aspects of the present invention, by forming a fusion zone 4 in the base metal region, in which the compressive residual stress in the welding line direction has been generated, to remove the compressive residual stress, the tensile residual stress in the embrittled region 3 is removed. With this, the brittle crack, which has been generated in the notch 2, is prevented from deflecting from the predetermined embrittled region 3.

The range of the compressive residual stress field, which is formed outside the embrittled region 3, depends on the length L of the embrittled region 3 and the thickness t of the test piece 1. Therefore, in accordance with aspects of the present invention, the fusion zone 4 is formed so that expression (1) below and expressions (2) and (3) below are satisfied.

$$1.0t \leq d \leq 7.0t \quad (1)$$

(where d: distance (mm) between the center of the embrittled region and the center of the fusion zone and t: thickness (mm) of the test piece (steel plate))

$$-0.3L \leq \Delta L1 \leq 0.3L \quad (2)$$

$$0 \leq \Delta L2 \leq 0.4L \quad (3)$$

(where L: length (mm) of the embrittled region, $\Delta L1$: distance (mm) in the propagation direction of the brittle crack between the front edge of the embrittled region and the front edge of the fusion zone (where negative value denotes a position on the non-evaluation region side from the front edge of the embrittled region 3 and a positive value denotes a position on the evaluation region side from the front edge of the embrittled region 3), and $\Delta L2$: distance (mm) in the propagation direction of the brittle crack between the edge of the test piece and the edge of the fusion zone).

Here, as illustrated in the FIGURE, the term "non-evaluation region" denotes a region in which an artificially generated brittle crack propagates through the embrittled region 3, and the term "evaluation region" denotes a region in which the embrittled region 3 does not exist and which is made only of the material which is the evaluation object. Here, the non-evaluation region in the FIGURE is a region which is located above the "evaluation region" in the FIGURE and in which the embrittled region 3 exists.

In expression (1) above, in the case where d (d: distance (mm) between the center of the embrittled region 3 and the center of the fusion zone 4) is less than 1.0t (t: thickness (mm) of the test piece (steel plate) 1), the residual stress generated in the base metal region due to the embrittled region 3 is not compressive but tensile, and therefore there is no effect of a compressive residual stress even when the embrittled region 3 is formed, and rather an additional tensile residual stress is generated in the embrittled region 3 due to the fusion zone 4, which results in an increased tendency for FPD to occur. On the other hand, in the case where d is more than 7.0t, since the compressive residual stress generated in the base metal region due to the embrittled region 3 fades away almost completely, there is no effect of removing the residual stress.

In expression (2) above, in the case where $\Delta L1$ ($\Delta L1$: distance (mm) in the propagation direction of the brittle crack between the front edge of the embrittled region 3 and the front edge of the fusion zone 4) is less than −0.3L (L: length (mm) of the embrittled region 3), the effect, which is caused by the fusion zone 4, of removing the residual stress does not reach the whole embrittled region 3, and FPD thus occurs. On the other hand, in the case where $\Delta L1$ is more than 0.3L, since a large portion of the residual stress generated by the fusion zone 4 is distributed in the evaluation region, it is not possible to perform appropriate evaluation.

In expression (3) above, in the case where $\Delta L2$ ($\Delta L2$: distance (mm) in the propagation direction of the brittle crack between the edge of the test piece 1 and the edge of the fusion zone 4) is less than 0, it denotes a position outside the test piece 1, and it is thus physically impossible to form a fusion zone. On the other hand, in the case where $\Delta L2$ is more than 0.4L, since the effect, which is caused by the fusion zone 4, of removing the residual stress does not reach the whole embrittled region 3, FPD occurs.

In the case where at least one of the expressions (1) through (3) described above is not satisfied by the formed fusion zone 4, it is not possible to remove the compressive residual stress, and therefore it is not possible to expect the predetermined effect according to aspects of the present invention to be realized.

In accordance with aspects of the present invention, as illustrated in the FIGURE, the fusion zone 4 is formed by preferably using an electron beam welding method so that expression (1), expression (2), and expression (3) described above are satisfied. A fusion zone 4 is formed in at least one location, and the fusion zone 4 is formed after the embrittled region 3 is formed so that the fusion zone 4 is spaced from the embrittled region 3 and arranged on one side or both sides of the embrittled region 3. In the case where the fusion zones 4 are arranged on both sides of the embrittled region 3 (the right-hand side and the left-hand side of the embrittled region 3), it is not necessary that the fusion zones 4 be arranged symmetrically with respect to the embrittled region 3. Here, the fusion zone 4 is preferably formed so that the expressions 1.0t≤d≤2.0t, −0.2L≤ΔL1≤0.2L, and ΔL2=0 are satisfied from the viewpoint of maximally realizing the effects.

In addition, although it is preferable that the fusion zone 4 be arranged parallel to the embrittled region 3 from the viewpoint of preparation of the test piece 1, it is needless to say that the arrangement is not limited to such an example as long as the compressive residual stress in the base metal is removed or decreased. Here, it is acceptable that the fusion zone 4 have an inclination of 60° or less, preferably 30° or less, or more preferably 10° or less with respect to the center line of the embrittled region 3. By setting the inclination of the fusion zone 4 to be 60° or less, it is possible to realize the effect, which is caused by the fusion zone 4, of removing the residual stress across the whole embrittled region 3, and it is thus possible to realize the effects according to aspects of the present invention to a higher degree.

In accordance with aspects of the present invention, although there is no particular limitation on the width of the fusion zone 4 as long as it is possible to perform fusion across the whole plate thickness, it is preferable that the width be, for example, 0.5 mm to 30 mm, because this makes it possible to perform fusion welding across the whole thickness of a steel plate in a practical operation.

The method for evaluating brittle crack arrestability of a steel plate according to aspects of the present invention may be used regardless of the strength of the steel plate, and the evaluation may be performed on, for example, a practical steel plate having a yield strength of 400 MPa to 800 MPa.

The large test piece according to aspects of the present invention may be used regardless of a method for generating an artificial crack, and such a method may be a method used in a double tensile test instead of a crack generation method utilizing impact used in a CAT. Even in such a case, it is possible to realize the effect of preventing FPD as in the case of a CAT.

Hereafter, aspects of the present invention will be further described in accordance with examples.

Examples

High-strength steel plates having a thickness of 19 mm and 80 mm and a strength of 470 MPa grade (having a yield strength of 470 MPa or more) or 600 MPa grade (having a yield strength of 600 MPa or more) were prepared. A large test piece 1 (having the thickness t, a width of 500 mm, and a length of 500 mm), as illustrated in the FIGURE, was taken from each of the steel plates so that the length direction of the large test piece 1 was the rolling direction.

A V-notch 2 was formed on one edge in the central portion in the length direction of the large test piece 1 taken, and an embrittled region 3 including the V-notch and having a length L extending in the propagation direction of the crack was formed by performing fusion welding by using an electron beam welding method. Here, the width of the embrittled region 3 was about 5 mm in the case of a thickness of 19 mm and about 10 mm in the case of a thickness of 80 mm. In this case, the stress-application direction was the length direction of the large test piece 1.

Subsequently, fusion zones 4 were formed in the large test piece 1 so that the fusion zones 4 were spaced from the embrittled region 3 and arranged parallel to the embrittled region 3. In this case, the fusion zones 4 having a length represented by length differences ΔL1 and ΔL2 with respect to the length L of the embrittled region 3 were arranged on both sides of the embrittled region 3 at a distance of d (mm) from the embrittled region 3. Here, "d (mm)" denotes the center-to-center distance between the embrittled region 3 and the fusion zone 4. In the case of test piece Nos. 1 through 10, fusion zones 4 identically shaped were arranged on both sides of the embrittled region 3. In the case of test piece No. 11, only one fusion zone 4 was arranged on one side of the embrittled region 3. In the case of test piece No. 12, only one fusion zone 4 having an inclination of 60° with respect to the center line of the embrittled region 3 was arranged on one side of the embrittled region 3. Here, "d (mm)" in the case of the fusion zone inclined denotes the shortest distance between the embrittled region 3 and the fusion zone 4. In the case of test piece No. 13, fusion zones 4 were arranged on both sides of the embrittled region 3 so that the fusion zones 4 had sizes different from each other. The combinations of d, ΔL1, and ΔL2 of the fusion zones 4 formed are given in Table 1.

As indicated in Table 1, large test pieces 1 having fusion zones 4 having various lengths and positions were used. A CAT was performed such that the large test piece 1 was cooled to a predetermined temperature (−70° C. in the case of a thickness of 19 mm and −10° C. in the case of a thickness of 80 mm), a predetermined striking energy was applied to the notch 2 after having applied a predetermined stress to the large test piece 1, and a brittle crack was generated, allowed to propagate, and arrested. In this CAT, the applied stress was 324 MPa in the case of a thickness of 19 mm and 307 MPa in the case of a thickness of 80 mm.

After having performed the CAT, the propagation state of the brittle crack was observed, and investigation into whether FPD (Fracture Pass Deviation) of the brittle crack occurred was conducted by performing visual observation on the appearance of the large test piece 1. Here, a case where the artificially generated brittle crack propagated outside the embrittled region 3 was judged as a case where FPD occurred, and a case where the artificially generated brittle crack propagated inside the embrittled region 3 to reach the evaluation region was judged as a case where no FPD occurred.

The obtained results are given in Table 1.

TABLE 1

| | Steel Plate | | | Fusion Zone-forming Condition**** | | | | | | | |
|---|---|---|---|---|---|---|---|---|---|---|---|
| Test No. | Strength Level (Yield Strength) (MPa) | Thickness t (mm) | Embrittled Region Length L of Embrittled Region (mm) | d (mm) | Conforming/ Nonconforming to Expression (1)* | ΔL1 (mm) | Conforming/ Nonconforming to Expression (2)** | ΔL2 (mm) | Conforming/ Nonconforming to Expression (3)*** | Brittle Crack Arrest Test Occurrence of FPD | Note |
| 1 | 600 | 19 | 50 | 5.0t | ○ | 0.3L | ○ | 0.1L | ○ | No | Example |
| | | | | 5.0t | ○ | 0.3L | ○ | 0.1L | ○ | | |
| 2 | 600 | 19 | 100 | 7.0t | ○ | −0.3L | ○ | 0.3L | ○ | No | Example |
| | | | | 7.0t | ○ | −0.3L | ○ | 0.3L | ○ | | |

TABLE 1-continued

| | Steel Plate | | | Fusion Zone-forming Condition**** | | | | | | | |
|---|---|---|---|---|---|---|---|---|---|---|---|
| Test No. | Strength Level (Yield Strength) (MPa) | Thickness t (mm) | Embrittled Region Length L of Embrittled Region (mm) | d (mm) | Conforming/ Nonconforming to Expression (1)* | ΔL1 (mm) | Conforming/ Nonconforming to Expression (2)** | ΔL2 (mm) | Conforming/ Nonconforming to Expression (3)*** | Brittle Crack Arrest Test Occurrence of FPD | Note |
| 3 | 600 | 19 | 150 | 2.0t | ○ | 0 | ○ | 0 | ○ | No | Example |
|   |     |    |     | 2.0t | ○ | 0 | ○ | 0 | ○ |    |         |
| 4 | 600 | 19 | 150 | 1.0t | ○ | 0 | ○ | 0 | ○ | No | Example |
|   |     |    |     | 1.0t | ○ | 0 | ○ | 0 | ○ |    |         |
| 5 | 470 | 80 | 150 | 3.0t | ○ | 0.2L | ○ | 0.2L | ○ | No | Example |
|   |     |    |     | 3.0t | ○ | 0.2L | ○ | 0.2L | ○ |    |         |
| 6 | 470 | 80 | 150 | 1.5t | ○ | 0 | ○ | 0 | ○ | No | Example |
|   |     |    |     | 1.5t | ○ | 0 | ○ | 0 | ○ |    |         |
| 7 | 600 | 19 | 150 | 0.2t | x | 0 | ○ | 0 | ○ | Yes | Comparative Example |
|   |     |    |     | 0.2t | x | 0 | ○ | 0 | ○ |    |         |
| 8 | 600 | 19 | 150 | 10.0t | x | 0.4L | x | 0 | ○ | Yes | Comparative Example |
|   |     |    |     | 10.0t | x | 0.4L | x | 0 | ○ |    |         |
| 9 | 600 | 19 | 150 | 2.0t | ○ | 0.6L | x | 0.3L | ○ | Yes | Comparative Example |
|   |     |    |     | 2.0t | ○ | 0.6L | x | 0.3L | ○ |    |         |
| 10 | 600 | 19 | 150 | 10.0t | x | −0.3L | ○ | 0.5L | x | Yes | Comparative Example |
|    |     |    |     | 10.0t | x | −0.3L | ○ | 0.5L | x |    |         |
| 11 | 600 | 19 | 150 | 2.5t | ○ | −0.1L | ○ | 0.3L | ○ | No | Example |
| 12 | 600 | 19 | 150 | 3.0t | ○ | −0.15L | ○ | 0.35L | ○ | No | Example |
| 13 | 600 | 19 | 150 | 1.0t | ○ | 0 | ○ | 0.2L | ○ | No | Example |
|    |     |    |     | 6.0t | ○ | −0.2L | ○ | 0 | ○ |    |         |

*1.0t ≤ d ≤ 7.0t ... (1)
**−0.3L ≤ ΔL1 ≤ 0.3L ... (2)
***0 ≤ ΔL2 ≤ 0.4L ... (3)
****Refer to the figure (Each of the cases with conditions given only in one row is a case where a fusion zone was formed only on one side.)

In the case of all the examples of the present invention (test Nos. 1 through 6 and test Nos. 11 through 13), the formed fusion zones satisfied expressions (1) through (3), and it was possible to prevent FPD. As a result, effective CAT results were obtained. On the other hand, in the case of the comparative examples, which were out of the range of the present invention, the formed fusion zones did not satisfy at least one of expressions (1) through (3), and FPD occurred. As a result, no effective CAT result was obtained.

In the case of test No. 7, expression (1) (condition regarding d) was not satisfied while expression (2) (condition regarding ΔL1) and expression (3) (condition regarding ΔL2) were satisfied, which was out of the range of the present invention, and FPD occurred. In the case of test No. 8, neither expression (1) (condition regarding d) nor expression (2) (condition regarding ΔL1) was satisfied while expression (3) (condition regarding ΔL2) was satisfied, which was out of the range of the present invention, and FPD occurred. In the case of test No. 9, expression (2) (condition regarding ΔL1) was not satisfied while expression (1) (condition regarding d) and expression (3) (condition regarding ΔL2) were satisfied, which was out of the range of the present invention, and FPD occurred. In the case of test No. 10, neither expression (1) (condition regarding d) nor expression (3) (condition regarding ΔL2) was satisfied while expression (2) (condition regarding ΔL1) was satisfied, which was out of the range of the present invention, and FPD occurred.

REFERENCE SIGNS LIST 1 large test piece
2 notch
3 embrittled region
4 fusion zone

The invention claimed is:

1. A method for evaluating brittle crack arrestability of a steel plate, the method comprising using a large test piece, cooling the large test piece to a predetermined temperature, applying a predetermined stress to the cooled large test piece, forming a crack propagating in the stressed large test piece, and evaluating brittle crack arrestability of the steel plate, wherein the large test piece is a test piece having a width of 500 mm or more and a length of 500 mm or more taken from the steel plate, a notch, at which a brittle crack is generated, is disposed on one edge in a central portion of the one edge in a direction in which the predetermined stress is to be applied to the large test piece, an embrittled region having a predetermined length L extending in a propagation direction of the brittle crack is formed by performing fusion welding before application of the predetermined stress to the large test piece at a tip of the notch or so as to include the tip, and a fusion zone spaced from the embrittled region is formed before application of the predetermined stress to the large test piece in at least one location in the test piece after the embrittled region is formed, the fusion zone being formed at a position satisfying expression (1) below and having lengths satisfying expressions (2) and (3) below:

$$1.0t \leq d \leq 7.0t \quad (1),$$

where d: distance (mm) between a center of the embrittled region and a center of the fusion zone and t: thickness (mm) of the test piece (steel plate), $$-0.3L \leq \Delta L1 \leq 0.3L \quad (2),$$

$$0 \leq \Delta L2 \leq 0.4L \quad (3),$$

where L: length (mm) of the embrittled region, ΔL1: distance (mm) in the propagation direction of the brittle crack between a front edge of the embrittled region and a front edge of the fusion zone (where negative value denotes a position on a non-evaluation region side from the front edge of the embrittled region and a positive value denotes a position on an evaluation region side from the front edge of the embrittled region), and ΔL2: distance (mm) in the propagation direction of the brittle crack between an edge of the test piece and an edge of the fusion zone.

2. The method for evaluating brittle crack arrestability of a steel plate according to claim 1, wherein the step of forming the crack propagating in the stressed large test piece comprises forming a crack using a double tensile process.

* * * * *